(12) United States Patent
Sato

(10) Patent No.: US 10,639,872 B2
(45) Date of Patent: May 5, 2020

(54) MULTILAYER TUBE

(71) Applicant: SANOH KOGYO KABUSHIKI KAISHA, Tokyo (JP)

(72) Inventor: Masatomi Sato, Koga (JP)

(73) Assignee: SANOH KOGYO KABUSHIKI KAISHA, Tokyo-To (JP)

( * ) Notice: Subject to any disclaimer, the term of this patent is extended or adjusted under 35 U.S.C. 154(b) by 400 days.

(21) Appl. No.: 15/236,732

(22) Filed: Aug. 15, 2016

(65) Prior Publication Data

US 2017/0021600 A1    Jan. 26, 2017

Related U.S. Application Data

(62) Division of application No. 12/525,336, filed as application No. PCT/JP2008/051489 on Jan. 31, 2008, now abandoned.

(30) Foreign Application Priority Data

Feb. 1, 2007  (JP) ................ 2007-023520

(51) Int. Cl.
| | | |
|---|---|---|
| *B32B 27/34* | (2006.01) | |
| *B32B 1/08* | (2006.01) | |
| *B32B 27/08* | (2006.01) | |
| *F16L 9/12* | (2006.01) | |
| *F16L 11/04* | (2006.01) | |
| *B32B 27/30* | (2006.01) | |
| *B32B 27/32* | (2006.01) | |

(52) U.S. Cl.
CPC .............. *B32B 27/34* (2013.01); *B32B 1/08* (2013.01); *B32B 27/08* (2013.01); *B32B 27/308* (2013.01); *B32B 27/32* (2013.01); *F16L 9/12* (2013.01); *F16L 11/04* (2013.01); *B32B 2250/24* (2013.01); *B32B 2307/202* (2013.01); *B32B 2307/546* (2013.01); *B32B 2307/7242* (2013.01); *B32B 2307/7265* (2013.01); *B32B 2597/00* (2013.01); *B32B 2605/08* (2013.01); *Y10T 428/1393* (2015.01)

(58) Field of Classification Search
CPC . B32B 1/08; B32B 2250/24; B32B 2307/202; B32B 2307/546; B32B 2307/7242; B32B 2307/7265; B32B 2597/00; B32B 2605/08; B32B 27/08; B32B 27/308; B32B 27/32; B32B 27/34; F16L 11/04; F16L 9/12; Y10T 428/1393
See application file for complete search history.

(56) References Cited

U.S. PATENT DOCUMENTS

2004/0126523 A1 *  7/2004  Masuda .............. B32B 1/08
                                                    428/35.7

* cited by examiner

*Primary Examiner* — Yan Lan
(74) *Attorney, Agent, or Firm* — Ladas & Parry LLP

(57) ABSTRACT

There is provided a multilayer resin tube having a plurality of thermoplastic resin layers, wherein an intermediate layer of the resin layers comprises an acid modified resin modified by the introduction of a functional group, and at least one layer is a barrier layer comprising an aromatic polyamide, for example, PA9T. The multilayer resin tube has good low-permeability attained with the use of an inexpensive resin, without using an expensive highly-functional resin such as a fluororesin.

9 Claims, 1 Drawing Sheet

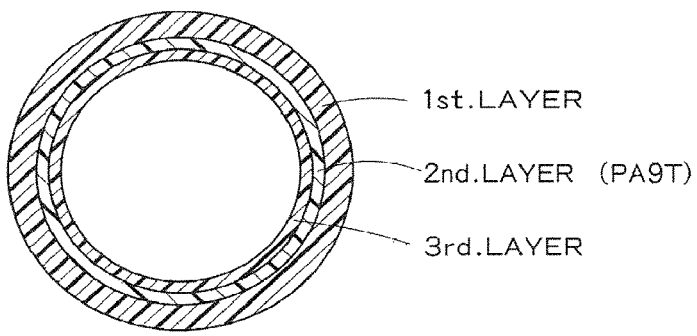
F I G. 1
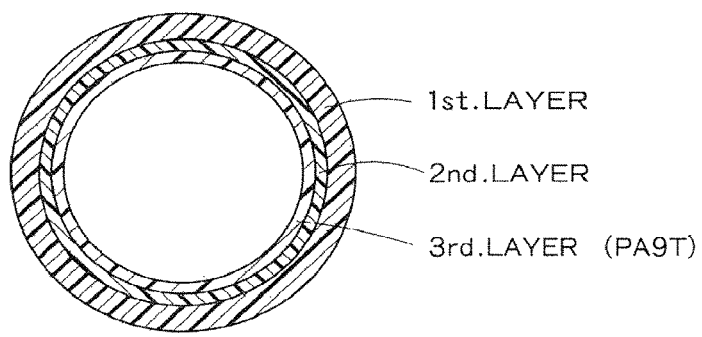
F I G. 2
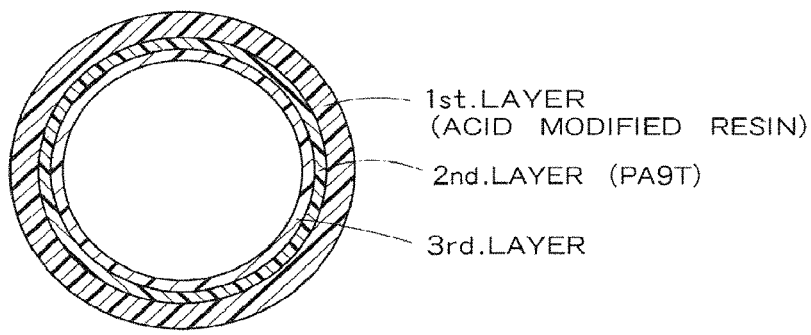
F I G. 3
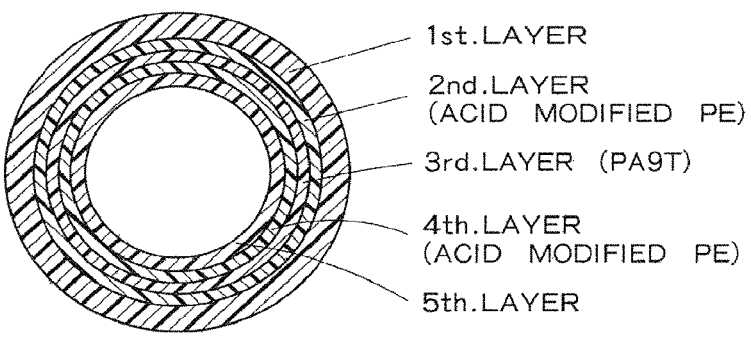
F I G. 4

MULTILAYER TUBE

CROSS-REFERENCE TO RELATED APPLICATIONS

This application is a Divisional of application Ser. No. 12/525,336 filed Nov. 18, 2009 which is a 371 of International Application PCT/JP2008/051489 filed Jan. 31, 2008 which claims the benefit of Japanese Application No. 2007-023520 filed Feb. 1, 2007.

TECHNICAL FIELD

The present invention relates to a multilayer tube for use as an automotive fuel tube.

BACKGROUND ART

These days a resin tube is increasingly being used as an automotive fuel tube. A resin tube has many advantages: Unlike a metal tube, a resin tube does not rust and is easy to process. In addition, a resin tube is lightweight and enables a high degree of design freedom.

On the other hand, there is a problem in the use of a resin tube as a fuel tube: Gasoline can permeate the tube and leak out. From an environmental standpoint, regulations on the fuel permeability of a resin tube for use as a fuel tube are becoming increasingly stricter these days in the United States and Europe.

The fuel permeability of a resin tube for use as a fuel tube can be determined by measuring a hydrocarbon permeability in accordance with CARB DBL test method using a SHED test machine; and a resin tube is determined to be low fuel-permeable when the measured hydrocarbon permeability is not more than 50 mg/m·day.

To impart a fuel permeation-resistant property (hereinafter referred to as "low permeability") to a resin tube for use as a fuel tube is therefore an urgent problem to be solved. A low-permeability multilayer resin tube is known which comprises a low-permeability resin layer in the innermost layer to be in contact with gasoline and a layer of a polyamide resin or the like in the outermost layer, with an adhesive layer interposed therebetween. A fluororesin (ETFE) is known to be very excellent in the low permeability, and the development of a resin tube comprising a barrier layer of the fluororesin is now in progress.

DISCLOSURE OF THE INVENTION

Though a resin tube comprising a barrier layer of such a fluororesin is effective in terms of the low permeability, it has the drawback of the fluororesin being expensive.

A multilayer resin tube may therefore be considered which uses a resin which is relatively good in the low permeability and relatively inexpensive. In fact, attempts have been made to produce a multilayer resin tube by coextrusion of e.g. inexpensive polyethylene (PE) with other resin(s). Such a multilayer resin tube, however, generally has the problem of poor adhesion between PE and another resin, making it impractical to use the resin tube as an automotive fuel tube.

it is therefore an object of the present invention to solve the above problems in the prior art and provide a multilayer tube which has good low-permeability attained with the use of an inexpensive resin, without using an expensive highly-functional resin such as a fluororesin, and has enhanced adhesion between resin layers, thus having a sufficient strength.

In order to achieve the object, the present invention provides a multilayer resin tube having a multilayer structure of a plurality of thermoplastic resin layers, wherein an intermediate layer of the plurality of resin layers comprises an acid modified resin modified by the introduction of a functional group, and at least one adjacent layer is a barrier layer comprising an aromatic polyamide as a main component.

The present invention also provides a multilayer resin tube having a multilayer structure of three or more thermoplastic resin layers, said tube having a barrier layer comprising an aromatic polyamide as a main component, wherein an outer layer and an inner layer, lying outside and inside the barrier layer, each comprise an acid modified resin modified by the introduction of a functional group.

The present invention also provides a multilayer resin tube having a multilayer structure of three or more thermoplastic resin layers, said tube comprising a barrier layer comprising an acid modified aromatic polyamide, modified by the introduction of a functional group, as a main component, and an outer resin layer and an inner resin layer, both adjacent to the barrier layer.

The present invention also provides a multilayer resin tube having a multilayer structure of three or more thermoplastic resin layers, said tube having a layer comprising an acid modified resin modified by the introduction of a functional group, wherein an inner layer, lying inside the acid modified resin layer, is a barrier layer comprising an aromatic polyamide as a main component.

The present invention also provides a multilayer resin tube having a multilayer structure of three or more thermoplastic resin layers, wherein a layer lying inside the outermost resin layer is a barrier layer comprising an acid modified aromatic polyamide, modified by the introduction of a functional group, as a main component.

The present invention also provides a multilayer resin tube having a multilayer structure of three or more thermoplastic resin layers, wherein the outermost resin layer comprises an acid modified resin modified by the introduction of a functional group, and a layer lying inside the acid modified resin layer is a barrier layer comprising an aromatic polyamide as a main component.

The present invention also provides a multilayer resin tube having a multilayer structure of five or more thermoplastic resin layers, wherein, in order from the outermost resin layer, the first layer is a PE (polyethylene) resin layer, the second and fourth layers are each an acid modified PE (polyethylene) resin layer, the resin being modified by the introduction of a functional group, and the third or fifth layer is a barrier layer comprising an aromatic polyamide.

According to the multilayer tube of the present invention, good low-permeability can be attained with the use of an inexpensive resin, without using an expensive highly-functional resin such as a fluororesin and, in addition, adhesion between resin layers can be enhanced, thereby securing a sufficient strength.

BRIEF DESCRIPTION OF THE DRAWINGS

FIG. 1 is a cross-sectional diagram illustrating a multilayer tube according to a first embodiment of the present invention;

FIG. 2 is a cross-sectional diagram illustrating a multilayer tube according to a second embodiment of the present invention;

FIG. 3 is a cross-sectional diagram illustrating a multilayer tube according to a third embodiment of the present invention; and FIG. 4 is a cross-sectional diagram illustrating a multilayer tube according to a fourth embodiment of the present invention.

BEST MODE FOR CARRYING OUT THE INVENTION

Preferred embodiments of the multilayer tube of the present invention will now be described with reference to the drawings.

First Embodiment

FIG. 1 shows a cross-section of a multilayer resin tube according to a first embodiment of the present invention. The multilayer resin tube, produced by coextrusion, is comprised of three resin layers: in order from the outermost layer, the first layer, the second layer and the third layer. The outer first layer is a resin layer to retain the strength of the tube and enhance the low-temperature impact resistance. The intermediate second layer is a barrier layer, composed of an aromatic polyamide (preferably polyamide 9T, 6T, etc.), to impart low fuel permeability to the resin tube. The first and third layers are each composed of an acid modified resin modified by the introduction of a functional group. The intermediate second layer is preferably composed of an acid modified PA9T modified e.g. with phthalic anhydride, maleic anhydride, naphthalene acid or carboxylic acid.

The outer first layer and the inner third layer are each preferably composed of an ethylene/GMA (glycidyl methacrylate) copolymer or an acid modified PE (polyethylene) modified e.g. with phthalic anhydride, maleic anhydride, naphthalene acid or carboxylic acid. The acid modified polyethylene preferably has an MFR viscosity of 0.03 to 5.0 g/10 min.

According to the first embodiment, the intermediate second layer can be made to function as a barrier layer having low fuel permeability with the use of a relatively inexpensive aromatic polyamide, such as PA9T, as a material. In addition, by using an acid modified resin for the first and third layers, an adhesion reaction by the functional group of the acid modified resin can be caused between the first layer and the second layer and between the second layer and the third layer, whereby the resin layers can be made to more strongly adhere to each other. Thus, in addition to the use of an inexpensive polyethylene-based resin in the first and third layers, the multilayer resin tube is provided with enhanced adhesion between the resin layers as well as a good fuel barrier function. The multilayer rein tube can possess barrier properties comparable to those obtained by the use of an expensive highly-functional resin, such as a fluororesin, while attaining a significant cost reduction in mass production by the use of inexpensive resin materials.

In a variation of the first embodiment, the intermediate second layer may be composed of an acid modified PA9T. In that case, the first and third layers may be composed of polyamide 6, polyamide 66, polyamide 11, polyamide 12 or a copolymer of polyamide 6 and polyamide 12. Alternatively, the first and third layers may preferably be composed of an ethylene/GMA (glycidyl methacrylate) copolymer or an acid modified PE (polyethylene) modified e.g. with phthalic anhydride, maleic anhydride, naphthalene acid or carboxylic acid.

In the multilayer resin tube having the second layer of acid modified PA9T, the first layer and the second layer, and also the second layer and the third layer attract each other through their functional groups. The adhesion strength between the resin layers can therefore be further enhanced.

Second Embodiment

FIG. 2 shows a multilayer tube according to a second embodiment of the present invention.

In the second embodiment, the intermediate second layer of the three resin layers is composed of an acid modified resin modified by the introduction of a functional group, and the inner third layer is a barrier layer composed of an aromatic polyamide (preferably polyamide 9T or 6T).

The intermediate second layer may be composed of an acid modified PA9T (polyamide 9T) modified e.g. with phthalic anhydride, maleic anhydride, naphthalene acid or carboxylic acid, an ethylene/GMA (glycidyl methacrylate) copolymer or an acid modified PE (polyethylene) (MFR value: 0.03 to 5.0 g/10 min).

The outer first layer is composed of a PE (polyethylene) resin or a polyamide (PA) resin. The polyethylene of the first layer preferably is high-density polyethylene (HDPE), low-density polyethylene (LDPE) or linear low-density polyethylene.

According to the second embodiment, the inner third layer can be made to function as a barrier layer having low fuel permeability with the use of a relatively inexpensive aromatic polyamide as a material. In addition, by using an acid modified resin for the second layer, an adhesion reaction by the functional group of the acid modified resin can be caused between the first layer and the second layer and between the second layer and the third layer, whereby the resin layers can be made to more strongly adhere to each other. Thus, in addition to the use of an inexpensive polyethylene-based resin, etc. in the first and second layers, the multilayer resin tube is provided with enhanced adhesion between the resin layers as well as a good fuel barrier function. The multilayer rein tube can possess barrier properties comparable to those obtained by the use of an expensive highly-functional resin, such as a fluororesin, while attaining a significant cost reduction in mass production by the use of inexpensive resin materials. Further, when an acid modified PA9T is used for the third layer, the second layer and the third layer attract each other through their functional groups. The adhesion strength between the two layers can therefore be further enhanced.

Third Embodiment

FIG. 3 shows a multilayer tube according to a third embodiment of the present invention.

In the third embodiment, the intermediate second layer of the three resin layers is a barrier layer composed of an aromatic polyamide [preferably acid modified PA9T (polyamide 9T) modified e.g. with phthalic anhydride, maleic anhydride, naphthalene acid or carboxylic acid].

The outermost first layer may be composed of an ethylene/GMA (glycidyl methacrylate) copolymer or an acid modified PE (polyethylene) (MFR value: 0.03 to 5.0 g/10 min).

Alternatively, the outermost first layer may be composed of a PE (polyethylene) resin or a polyamide resin (polyamide 6, polyamide 66, polyamide 11, polyamide 12 or a copolymer of polyamide 6 and polyamide 12). The polyethylene of the first layer preferably is high-density polyethylene (HDPE), low-density polyethylene (LDPE) or linear low-density polyethylene.

According to the third embodiment, the intermediate second layer can be made to function as a barrier layer having low fuel permeability with the use of a relatively inexpensive aromatic polyamide as a material. In addition, by using an acid modified resin for the outermost first layer, an adhesion reaction by the functional group of the acid modified resin can be caused between the first layer and the second layer, whereby these layers can be made to more strongly adhere to each other. Thus, in addition to the use of an inexpensive polyethylene-based resin, etc. in the first layer, the multilayer resin tube is provided with enhanced adhesion between the resin layers as well as a good fuel barrier function. The multilayer rein tube can possess barrier properties comparable to those obtained by the use of an expensive highly-functional resin, such as a fluororesin, while attaining a significant cost reduction in mass production by the use of inexpensive resin materials.

Fourth Embodiment

FIG. 4 shows a multilayer tube according to a fourth embodiment of the present invention.

The multilayer resin tube has a five-layer structure in which, in order from the outermost resin layer, the first layer is a PE (polyethylene) resin layer, the second and fourth layers are each an acid modified PE (polyethylene) resin layer, the resin being modified by the introduction of a functional group, and the third or fifth layer is a barrier layer composed of an aromatic polyamide (preferably polyamide 9T or 6T).

According to the fourth embodiment, the third or fifth layer can be made to function as a barrier layer having low fuel permeability with the use of a relatively inexpensive aromatic polyamide as a material. In addition, by interposing an acid modified PE resin between the first and third layers and between the third and fifth layers, an adhesion reaction by the functional group of the acid modified PE resin can be caused between the resin layers, whereby the resin layers can be made to strongly adhere to each other despite the use of at least three PE layers. Thus, in addition to the use of an inexpensive polyethylene-based resin, etc., the multilayer resin tube is provided with enhanced adhesion between the resin layers as well as a good fuel barrier function. The multilayer rein tube can possess barrier properties comparable to those obtained by the use of an expensive highly-functional resin, such as a fluororesin, while attaining a significant cost reduction in mass production by the use of inexpensive resin materials.

In the above-described first to fourth embodiments, a conductive filler may be added to the innermost layer to impart electrical conductivity to the tube. Carbon nanotubes, carbon black or carbon fibers can preferably be used as the conductive filler. The amount of the conductive filler is generally 5 to 30% by weight based on 100% by weight of the raw materials. If the amount of the conductive filler is less than 5%, it is difficult to obtain a surface resistivity of not more than 10E6 Ω/sq which is necessary for a fuel tube. If the amount exceeds 30% by weight, on the other hand, there may be a considerable lowering of the strength.

EXAMPLES

Table 1 shows specific examples of resins usable for the respective layers of multilayer resin tubes according to the present invention. In Table 1, Examples 1 to 4 correspond to the first embodiment, Examples 5 to 8 correspond to the second embodiment, and Examples 9 and 10 correspond to the fourth embodiment.

TABLE 1

| Ex. No. | 1st layer | 2nd layer | 3rd layer | 4th layer | 5th layer |
|---|---|---|---|---|---|
| 1 | PA6 | Modified PE | PA9T | — | — |
| 2 | Ethylene/GMA | PA9T | Ethylene/GMA | — | — |
| 3 | Ethylene/GMA | Modified PA9T | Ethylene/GMA | — | — |
| 4 | Modified PE | Modified PA9T | Modified PE | — | — |
| 5 | PA | Modified PA9T | Cond. PA9T | — | — |
| 6 | PE | Ethylene/GMA | PA9T | — | — |
| 7 | PE | Ethylene/GMA | Modified PA9T | — | — |
| 8 | PE | Modified PE | Modified PA9T | — | — |
| 9 | PE | Modified PE | PA9T | Modified PE | PE |
| 10 | PE | Modified PE | PA | Modified PE | PA9T |

In Examples 1, 3, 4 and 7 to 10, the proportion of the acid modified resin(s) (excluding ethylene/GMA copolymer) in all the resins of the tube is less than 50% by weight. In Examples 4, 9 and 10, the modified PE resin has a tensile breaking strength of not less than 12 MPa, a breaking elongation of not less than 300% and an MFR of not less than 0.5 g/min.

In the Examples (excluding Examples 1 and 5), the resins for the first layer has a density of 0.90 to 1.5 g/cm3, a flexural modulus of not less than 850 MPa and an environmental stress crack resistance of not less than 200 hr.

The invention claimed is:

1. A multilayer resin tube having a multilayer structure of three or more thermoplastic resin layers, said tube having a barrier layer comprising a modified aromatic polyamide as a main component, wherein the modified aromatic polyamide is produced by modifying an aromatic polyamide with an acid such that the modified aromatic polyamide comprises an acid functional group of the acid, and wherein a second layer, lying outside of the barrier layer, comprises, as a main component, an acid modified resin modified by the introduction of a functional group.

2. The multilayer resin tube according to claim 1, wherein the second layer and a third layer, lying outside and inside the barrier layer respectively, each comprise an acid modified resin modified by the introduction of a functional group.

3. The multilayer resin tube according to claim 2, wherein the acid modified aromatic polyamide in the barrier layer comprises acid modified PA9T.

4. The multilayer resin tube according to claim 2, wherein a proportion of acid modified resins, excluding ethylene/GMA copolymer, in all the resins of the tube is less than 50% by weight.

5. The multilayer resin tube according to claim 2, wherein the second layer comprises a resin that, excluding PA, has a density of 0.90 to 1.5 g/cm3, a flexural modulus of not less than 850 MPa and an environmental stress crack resistance of not less than 200 hr.

6. The multilayer resin tube according to claim 2, wherein an innermost layer of the multilayer resin tube is a conductive resin layer.

7. The multilayer resin tube according to claim 1, wherein the acid comprises phthalic anhydride, maleic anhydride, naphthalene acid or carboxylic acid.

8. A multilayer resin tube having a multilayer structure of three or more thermoplastic resin layers, said tube having:
- a barrier layer comprising, as a main component, a modified PA9T, wherein the modified PA9T is produced by modifying a PA9T with an acid such that the modified PA9T comprises an acid functional group of the acid; and
- a second layer, lying outside of the barrier layer, comprising an acid modified resin modified by the introduction of a functional group.

9. The multilayer resin tube according to claim 8, wherein the acid comprises phthalic anhydride, maleic anhydride, naphthalene acid or carboxylic acid.

* * * * *